US011318453B2

(12) United States Patent
Jansen et al.

(10) Patent No.: US 11,318,453 B2
(45) Date of Patent: May 3, 2022

(54) HYDROTREATING CATALYST CONTAINING PHOSPHORUS AND BORON

(75) Inventors: Marcel Adriaan Jansen, Nieuw Vennep (NL); Henk Jan Tromp, Utrecht (NL); Bob Gerardus Oogjen, Almere (NL); Sander Hendrikus Lambertus Thoonen, Utrecht (NL); Jan Nieman, Maarssen (NL); Wilhelmus Clemens Jozef Veerman, Volendam (NL)

(73) Assignee: Albemarle Catalysts Company B.V., Amsterdam (NL)

(*) Notice: Subject to any disclaimer, the term of this patent is extended or adjusted under 35 U.S.C. 154(b) by 553 days.

(21) Appl. No.: 13/265,728

(22) PCT Filed: Apr. 21, 2010

(86) PCT No.: PCT/EP2010/002458
§ 371 (c)(1),
(2), (4) Date: Oct. 21, 2011

(87) PCT Pub. No.: WO2010/121807
PCT Pub. Date: Oct. 28, 2010

(65) Prior Publication Data
US 2012/0037540 A1 Feb. 16, 2012

Related U.S. Application Data

(60) Provisional application No. 61/171,253, filed on Apr. 21, 2009.

(51) Int. Cl.
| | | |
|---|---|---|
| *B01J 37/00* | (2006.01) | |
| *B01J 37/02* | (2006.01) | |
| *B01J 21/02* | (2006.01) | |
| *B01J 23/882* | (2006.01) | |
| *B01J 23/883* | (2006.01) | |
| *B01J 35/10* | (2006.01) | |
| *B01J 23/85* | (2006.01) | |
| *C10G 45/08* | (2006.01) | |
| *B01J 27/188* | (2006.01) | |
| *B01J 37/20* | (2006.01) | |

(52) U.S. Cl.
CPC ........... *B01J 37/0009* (2013.01); *B01J 21/02* (2013.01); *B01J 23/85* (2013.01); *B01J 23/882* (2013.01); *B01J 23/883* (2013.01); *B01J 27/188* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 35/1061* (2013.01); *B01J 37/0203* (2013.01); *B01J 37/0207* (2013.01); *B01J 37/0219* (2013.01); *C10G 45/08* (2013.01); *B01J 37/20* (2013.01); *C10G 2300/70* (2013.01)

(58) Field of Classification Search
CPC . B01J 21/02; B01J 21/04; B01J 23/882; B01J 23/883; B01J 27/19; B01J 27/1853
USPC ................ 502/202, 204, 206, 207, 211, 213
See application file for complete search history.

(56) References Cited

U.S. PATENT DOCUMENTS

| | | | | |
|---|---|---|---|---|
| 2,938,001 | A | * | 5/1960 | De Rosset ............... B01J 27/19 502/202 |
| 3,125,507 | A | | 3/1964 | Tupman et al. |
| 3,453,219 | A | * | 7/1969 | O'Hara ................... B01J 27/188 502/204 |
| 3,617,532 | A | | 11/1971 | Plundo et al. |
| 3,666,685 | A | | 5/1972 | O'Hara |
| 3,954,670 | A | | 5/1976 | Pine |
| 4,028,227 | A | | 6/1977 | Gustafson |
| 4,036,784 | A | | 7/1977 | Gembicki et al. |
| 4,195,062 | A | | 3/1980 | Martin et al. |
| 4,294,687 | A | | 10/1981 | Pinaire et al. |
| 4,325,804 | A | | 4/1982 | Everett et al. |
| 4,395,328 | A | | 7/1983 | Hensley, Jr. et al. |
| 4,399,057 | A | | 8/1983 | Hensley, Jr. et al. |
| 4,444,655 | A | | 4/1984 | Shiroto et al. |

(Continued)

FOREIGN PATENT DOCUMENTS

| | | |
|---|---|---|
| CN | 1854260 | 11/2006 |
| CN | 1854260 A | 11/2006 |

(Continued)

OTHER PUBLICATIONS

Comparison of Product Selectivity During Hydroprocessing of Bitumen Derived Gas Oil in the Precense Of NiMo/Al2O3 Catalyst Containing Boron and Phosphorous. D. Ferdous et al.*
Preparation of Boron-Containing Alumina Supports by Kneading. Jean Luc Dubois et al.*
Chen, Yu-Wen, et al., Hydrotreating of Residue Oil Over Aluminum Borate-Supported CoMo and NiMo Catalysts, Catalysis Today, 50, 1999, pp. 57-61.
Chen, Yu-Wen, et al., "Hydrodesulfurization of Residue Oils Over NiMo/Alumina-Aluminum Borate Catalysts: Effect of Boria Content", Ind. Eng. Chem. Res., 1994, 33(9), pp. 2040-2046.

(Continued)

*Primary Examiner* — Patricia L. Hailey
(74) *Attorney, Agent, or Firm* — R. Andrew Patty, II; Mary H. Drabnis; McGlinchey Stafford PLLC

(57) ABSTRACT

A catalyst having at least one Group VIB metal component, at least one Group VIII metal component, a phosphorus component, and a boron-containing carrier component. The amount of the phosphorus component is at least 1 wt %, expressed as an oxide ($P_2O_5$) and based on the total weight of the catalyst, and the amount of boron content is in the range of about 1 to about 13 wt %, expressed as an oxide ($B_2O_3$) and based on the total weight of the catalyst. In one embodiment of the invention, the boron-containing carrier component is a product of a co-extrusion of at least a carrier and a boron source. A method for producing the catalyst and its use for hydrotreating a hydrocarbon feed are also described.

26 Claims, No Drawings

(56) References Cited

U.S. PATENT DOCUMENTS

| | | | |
|---|---|---|---|
| 4,940,533 A | 7/1990 | Simpson et al. | |
| 5,043,511 A | 8/1991 | Imai et al. | |
| 5,155,082 A | 10/1992 | Tung et al. | |
| 5,468,709 A | 11/1995 | Yamaguchi et al. | |
| 5,525,209 A | 6/1996 | Billon et al. | |
| 5,609,750 A * | 3/1997 | Nat | B01J 21/02 208/122 |
| 5,714,660 A | 2/1998 | Wu et al. | |
| 5,827,421 A | 10/1998 | Sherwood, Jr. | |
| 6,015,485 A * | 1/2000 | Shukis | B01J 21/04 208/108 |
| 6,019,953 A | 2/2000 | Van den Brink et al. | |
| 6,037,300 A | 3/2000 | Kasztelan et al. | |
| 6,071,402 A | 6/2000 | Danot et al. | |
| 6,090,745 A | 7/2000 | DuBois et al. | |
| 6,106,698 A | 8/2000 | Benazzi et al. | |
| 6,117,307 A | 9/2000 | Benazzi et al. | |
| 6,123,831 A | 9/2000 | Benazzi et al. | |
| 6,136,180 A | 10/2000 | Benazzi et al. | |
| 6,171,474 B1 | 1/2001 | Kasztelan et al. | |
| 6,174,429 B1 | 1/2001 | George-Marchal et al. | |
| 6,207,870 B1 * | 3/2001 | Kasztelan | B01J 21/02 208/144 |
| 6,231,750 B1 | 5/2001 | Kasztelan et al. | |
| 6,239,066 B1 * | 5/2001 | Shukis | B01J 21/04 502/305 |
| 6,251,261 B1 | 6/2001 | Kasztelan et al. | |
| 6,267,874 B1 | 7/2001 | Iijima et al. | |
| 6,280,610 B1 | 8/2001 | Uragami et al. | |
| 6,309,537 B1 | 10/2001 | Harle et al. | |
| 6,344,135 B1 | 2/2002 | Benazzi et al. | |
| 6,387,246 B1 | 5/2002 | Benazzi et al. | |
| 6,402,936 B1 | 6/2002 | Benazzi et al. | |
| 6,436,280 B1 * | 8/2002 | Harle | B01J 23/85 208/216 R |
| 6,436,870 B1 | 8/2002 | Iijima et al. | |
| 6,531,051 B1 | 3/2003 | Kasztelan et al. | |
| 6,531,054 B1 | 3/2003 | Gerritsen et al. | |
| 6,534,437 B2 | 3/2003 | Eijsbouts et al. | |
| 6,540,908 B1 * | 4/2003 | Eijsbouts | B01J 31/0215 208/213 |
| 6,566,296 B2 | 5/2003 | Plantenga et al. | |
| 6,576,584 B1 | 6/2003 | Iijima et al. | |
| 6,623,628 B1 | 9/2003 | Bronner et al. | |
| 6,638,888 B1 | 10/2003 | Peratello et al. | |
| 6,652,738 B2 | 11/2003 | Eijsbouts et al. | |
| 6,656,349 B1 | 12/2003 | Fujita et al. | |
| 6,667,267 B1 | 12/2003 | Benazzi et al. | |
| 6,712,953 B1 | 3/2004 | Kasztelan et al. | |
| 6,780,817 B1 | 8/2004 | Koyama et al. | |
| 6,814,856 B1 | 11/2004 | Aussillous et al. | |
| 6,860,987 B2 | 3/2005 | Plantenga et al. | |
| 6,893,553 B1 | 5/2005 | Abe et al. | |
| 7,250,107 B2 | 7/2007 | Benazzi et al. | |
| 7,332,071 B2 | 2/2008 | Benazzi et al. | |
| 7,381,321 B2 | 6/2008 | Benazzi et al. | |
| 7,390,766 B1 | 6/2008 | Klein | |
| 2001/0000006 A1 | 3/2001 | Kasztelan et al. | |
| 2001/0023840 A1 | 9/2001 | Harle et al. | |
| 2002/0016253 A1 | 2/2002 | Mignard et al. | |
| 2002/0033355 A1 | 3/2002 | Mignard et al. | |
| 2002/0160911 A1 | 10/2002 | Benazzi et al. | |
| 2003/0085154 A1 | 5/2003 | Benazzi et al. | |
| 2003/0089638 A1 * | 5/2003 | Gueret | C10G 49/007 208/97 |
| 2003/0173256 A1 | 9/2003 | Fujikawa et al. | |
| 2004/0004021 A1 | 1/2004 | Benazzi et al. | |
| 2004/0138059 A1 | 7/2004 | Euzen et al. | |
| 2004/0186013 A1 * | 9/2004 | Iwata | B01J 27/19 502/208 |
| 2004/0232047 A1 | 11/2004 | Benazzi et al. | |
| 2004/0238410 A1 | 12/2004 | Inoue et al. | |
| 2005/0211603 A1 | 9/2005 | Guillaume et al. | |
| 2006/0070915 A1 | 4/2006 | Euzen et al. | |
| 2006/0249429 A1 | 11/2006 | Iki et al. | |
| 2008/0146438 A1 * | 6/2008 | Bai | B01J 31/2239 502/173 |
| 2008/0149531 A1 | 6/2008 | Roy-Auberger et al. | |
| 2008/0156694 A1 | 7/2008 | Chapus et al. | |
| 2009/0188834 A1 | 7/2009 | Euzen et al. | |
| 2012/0168347 A1 * | 7/2012 | Eijsbouts-Spickova | B01J 27/1853 208/46 |

FOREIGN PATENT DOCUMENTS

| | | | | |
|---|---|---|---|---|
| CN | 10-3055909 | * | 4/2013 | B01J 27/19 |
| CN | 101240190 A | | 8/2013 | |
| EP | 19880401551 | * | 3/1990 | |
| EP | 0297949 B1 | | 10/1990 | |
| EP | 0567272 A1 | | 10/1993 | |
| EP | 0590894 A1 | | 4/1994 | |
| EP | 0601722 B1 | | 6/1994 | |
| EP | 0876443 B1 | | 11/1998 | |
| EP | 1060794 A1 | | 12/2000 | |
| EP | 1702682 A1 | | 9/2006 | |
| EP | 1880760 A1 | | 1/2008 | |
| FR | 2393609 A1 | | 5/1979 | |
| FR | 2775202 A1 | | 8/1998 | |
| FR | 2775442 A1 | | 9/1999 | |
| FR | 2793704 A1 | | 11/2000 | |
| GB | 885866 | * | 12/1961 | |
| JP | 56-040432 | * | 4/1981 | |
| JP | 3-273092 | | 12/1991 | |
| JP | 8-003569 | | 1/1996 | |
| JP | 2762371 B2 | | 6/1998 | |
| JP | 2986838 B2 | | 12/1999 | |
| JP | 2000-093804 A | | 4/2000 | |
| JP | 2000-135441 | * | 5/2000 | B01J 27/188 |
| JP | 2000-135441 A | | 5/2000 | |
| JP | 2001-334150 A | | 12/2001 | |
| JP | 2002-233761 A | | 8/2002 | |
| JP | 2006-35026 A | | 2/2006 | |
| KR | 10-2006-0100408 A | | 9/2006 | |
| WO | 1996/041848 A1 | | 12/1996 | |
| WO | 1997/008274 A1 | | 3/1997 | |
| WO | 2005/035691 A1 | | 4/2005 | |
| WO | WO2005/035691 | * | 4/2005 | |
| WO | 2006/111093 A1 | | 10/2006 | |
| WO | 2007/080288 A1 | | 7/2007 | |
| WO | 2010/121807 A1 | | 10/2010 | |

OTHER PUBLICATIONS

Dalai, Ajaj. K., "Effect of Boron and Phosphorus Addition to NiMo Supported on Al2O3 and Carbon Nanotubes: Impact on the Morphology and Activity for Hydrotreating of Gas Oils", Prepr. Pap.-Am. Chem Soc., Div. Petr. Chem., 2007, 52 (1), pp. 93-96.

DeCanio, Elaine. C., et al., "FT-IR Analysis of Borate-Promoted Ni—Mo/Al2O3 Hydrotreating Catalysts", Colloids and Surfaces A: Physicochemical and Engineering Aspects, 105, 1995, pp. 123-132.

Dubois, Jean-Luc, et al., "Effects of Boron in Co—Mo/B—Al2O3 Hydrotreatment Catalysts", Catalysis Today, 29, 1996, pp. 191-195.

Ferdous, D., et al., "A Series of NiMo/Al2O3 Catalysts Containing Boron and Phosphorus Part I. Synthesis and Characterization", Applied Catalysis A: General, 260, 2004, pp. 137-151.

Ferdous, D., et al., "A Series of NiMo/Al2O3 Catalysts Containing Boron and Phosphorus Part II. Hydrodenitrogenation and Hydrodesulfurization Using Heavy Gas Oil Derived From Athabasca Bitumen", Applied Catalysis A: General, 260, 2004, pp. 153-162.

Flego, C., et al., "Mixed Oxides as a Support for New CoMo Catalysts". Catalysis Today, 65, 2001, pp. 265-270.

Lecrenay, Emmanuel, et al., "Hydrodesulfurization Activity of CoMo and NiMo Catalysts Supported on Some Acidic Binary Oxides", Applied Catalysis A: General, 175, 1998, pp. 237-243.

Lewandowski, M., "The Effect of Boron Addition on Hydrodesulfurization and Hydrodenitrogenation Activity of NiMo/Al2O3 Catalysts", Fuel, 79, 2000, pp. 487-495.

Li, Chiuping, et al., "Hydrodesulfurization Reactions of Atmoshpheric Gas Oil Over Cobalt-Molybdenum/Alumina-Aluminum Borate Catalysts", Ind. Eng. Chem. Res., 1993, 32(8), pp. 1573-1578.

(56) References Cited

OTHER PUBLICATIONS

Li, Dien, et al., "The Effect of Boron on HYD, HC, and HDS Activities of Model Compounds over Ni—Mo/γ—Al2O3—B2O3 Catalysts", Applied Catalysis B: Environmental, 16, 1998, pp. 255-260.
Li, Dien, et al., "Spectroscopic Characterization of Ni—Mo/γ—Al2O3—B2O3 Catalysts for Hydrodesulfurization of Dibenzothiophene", Article No. CA971730, Journal of Catalysis, 170, 1997, pp. 357-365.
Muralidhar, G., et al., "Catalytic Functionalities of Supported Sulfides I. Effect of Support and Additives on the CoMo Catalyst", Journal of Catalysis, 85, 1984, pp. 44-52.
Ramirez, Jorge, et al., "Effect of Boron Addition on the Activity and Selectivity of Hydrotreating CoMo/Al2O3 Catalysts", Applied Catalysis A: General, 132, 1995, pp. 317-334.
Saih, Youssef, et al., "Catalytic Activity of CoMo Catalysts Supported on Boron-Modified Alumina for the Hydrodesulphurization of Dibenzothiophene and 4,6-dimethyldibenzothiophene", Applied Catalysis A: General, 353, 2009, pp. 258-265.
Tsai, Ming C., et al., "Hydrodesulfurization and Hydrodemetalation Reactions of Resifue Oils Over Cobalt-Molybdenum/Aluminum Borate Catalysts in a Trickle Bed Reactor", Ind. Eng. Chem. Res., 1991, 30(8), pp. 1801-1810.
Usman, et al., "The Effect of Boron Addition on the Hydrodesulfurization Activity of MoS2/Al2O3 and Co—MoS2/Al2O3 Catalysts", Journal of Catalysis, 227, 2004, pp. 523-529.
Usman, U., et al., "Effect of Boron Addition on a MoO3/Al2O3 Catalyst Physicochemical Characterization", Applied Catalysis A: General, 286, 2005, pp. 148-154.
Chen, Yu-Wen, et al., "Hydrodesulfurization of Atmospheric Gas Oil over NiMo/Aluminum Borate Catalysts in a Trickle Bed Reactor", Ind. Eng. Chem. Res., 1997, 36, 2521-2525.
Delmastro, A., et al., "Characterization of Microporous Amorphous Alumina-Boria", J. Chem. Soc. Faraday Trans., 1992, 88(14), 2065-2070.
Ding, L., et al., "Effect of Fluorine and Boron Modification on the HDS, HDN and HDA Activity of Hydrotreating Catalysts", Applied Catalysis A: General 301 (2006), 241-250.
Dubois, Jean-Luc, et al., "Preparation of boron-containing alumina supports by kneading", Preparation of Catalysts VI, Scientific Bases for the Preparation of Heterogeneous Catalysts, 1995, Elsevier Science, pp. 833-842.
Ferdous, D., et al., "Comparison of Product Selectivity During Hydroprocessing of Bitumen Derived Gas Oil in the Presence of NiMo/Al2O3 Catalyst Containing Boron and Phosphorus", Fuel, 85, 2006, 1286-1297.
Ferdous, D., et al., "Hydrodenitrogenation and Hydrodesulfurization of Heavy Gas Oil Using NiMo/Al2O3 Catalyst Containing Boron: Experimental and Kinetic Studies", Ind. Eng. Chem. Res., 2006, 45, 544-552.
Ferdous, D., et al., "X-ray absorption near edge structure and X-ray photo electron spectroscopy analyses of NiMo/Al2O3 catalysts containing boron and phosphorus", Journal of Molecular Catalysis A: Chemical 234, 2005, 169-179.
Kawai, T., et al., "EXAFS measurements of a working catalyst in the liquid phase: An in situ study of a Ni2P hydrodesulfurization catalyst", Journal of Catalysis, 241, 2006, 20-24.
Lulic, P., "Influence of Additives on Activity of Hydrotreatment Catalysts", Petrochemie, Erdol Erdgas kohle, 116/3, Mar. 2000, 133-136.
Lulic, P., et al., "The Relation Between the Quality of Catalyst and Feedstock in the Hydrotreating Process", Catalysts in Petroleum Refining, 1989, 1990 Elsevier Science Publishers, 53, 451-461.
Krasnopol'skaya, S.M., et al., "Study of the Texture and Activity of Aluminum-Nickel-Molybdenum Catalysts Promoted by High-Silicon Zeolites", Institute of Petroleum and Coal Chemistry, Irkutsk and Bratsk Industrial Institute, Translated from Kinetika i Kataliz, vol. 32, 5, Sep.-Oct. 1991, pp. 1267-1270, pp. 1142-1144 enclosed.
Nivarov, V.A., et al., "State of CoN+ Ions in Al2O3—B2O3—CoO Catalysts, as Determined by Electronic Spectroscopy", All-Union Scientific-Research Chemical Technology Institute of the Medical Industry, Tashkent. Translated from Kinetika i Kataliz, vol. 26, No. 6, pp. 1446-1450, Nov.-Dec. 1985, pp. 1246-1249 enclosed.
Prokopyuk, A.S., et al., "Features of Application of Zeolite-Containing Catalysts in Hydrotreating Petroleum Fractions", Chemistry and Technology of Fuels and Oils, 1994, vol. 30, Nos. 7-8, pp. 310-313.
Stranick, M.A., et al., "The Effect of Boron on the State and Dispersion of Co/Al2O3 Catalysts", Journal of Catalysis, 104, 1987, pp. 396-412.
Torres-Mancera, P., et al., "Hydrodesulfurization of 4,6-DMDBT on NiMo and CoMo catalysts supported on B2O3—Al2O3", Catalysis Today, 2005, 107-108, pp. 551-558.
Trawczynski, J., et al., "Doped aluminas as hydrorefining catalyst supports", Applied Catalysis A: General 119, 1994, pp. 59-67.
Tsai, M.C., et al., "Hydrothermal Stability of Aluminum Borate", Catalysis Letters, 6, 1990, pp. 225-230.
Usman, T.K., et al., "Effect of Boron Addition on the Intrinsic Activity of Al2O3-Supported Cobalt-Tungsten and Cobalt-Molybdenum Sulfide Catalysts for the Hydrodesulfurization of Thiophene", Bull. Chem. Soc. Jpn., vol. 79, No. 4, 2006, pp. 637-643.
Usman, T.K., et al., "Effect of Boron Addition on the Surface Structure of Co—Mo/Al2O3 Catalysts", Journal of Catalysis, 247, 2007, pp. 78-85.
Usman, T.K., et al., "Thermal Stability of the Co—Mo—S Structure as Studied by a CVD Technique Using Co(CO)3NO", Ind. Eng. Chem. Res., 2006, 45, 3537-3543.
Vysotskii, A.V., et al., "Acidity of Zeolite-Promoted Aluminum-Nickel-Molybdenum Hydrodesulfurization Catalysts", Bratsk Industrial Institute. Translated from Kinetika i Katalyz, vol. 33, No. 1, pp. 197-204, Jan.-Feb. 1992, pp. 157-163 enclosed.
A. Adamczyk and M. Handke, J. Molecular Structure, 2000, 555, 159-164 (6 pages).
Boron Phosphate, https://en.wikipedia.org/wiki/Boron_phospohate, visited Dec. 7, 2015 (2 pages).
F.M. Bautista et al., J. Catal., 1998, 173, 333-344 (12 pages).
Cheng, M., et al., "Preparation and characterization of Mo Catalysts over AlMCM-41/γ—Al2O3 Extruded Supports", Applied Catalysis A: General, 1999, 183, pp. 199-208.
Rhee, Young-Woo, et al., "Effects of Pore Structure on Initial Catalytic Activity for Residuum Desulfurization and Coal Liquefaction", Energy & Fuels, 1989, 3, pp. 391-397.
Kraushaar-Czarnetzki, Bettina et al., "Shaping of Solid Catalysts" Synthesis of Solid Catalysts. Edited by K.P. de Jong, Wiley-VCH Verlag GmbH & Co. KGaA, Weinheim, 2009, pp. 173-187.
Kmecl, Primoz et al., "Boron Phosphate: Its Synthesis, Gradual Crystallsation and Characterisation of Bulk Properties", Acta Chim. Slov., 1999, 46(2), pp. 161-171.
Reymond, J.P., et al., "Porous texture modifications of a series of silica and silica-alumina hydrogeis and xerogels: a thermoporometry study", Studies in Surface Science and Catalysis 128, edited by K.K Unger et al., Elsevier Science B.V., 2000, pp. 623-631.

\* cited by examiner

HYDROTREATING CATALYST CONTAINING PHOSPHORUS AND BORON

REFERENCE TO RELATED APPLICATIONS

This application is the National Stage of International Patent Appl. No. PCT/EP2010/002458 filed on Apr. 21, 2010, which in turn claims the benefit of U.S. Provisional Patent Appl. No. 61/171,253, filed on Apr. 21, 2009, the disclosure of which is incorporated herein by reference.

TECHNICAL FIELD

The present invention is in the field of catalysts useful for hydrotreating hydrocarbon feedstocks in refining processes.

THE INVENTION

In general, hydrotreating catalysts are composed of a carrier having deposited thereon a Group VIB (of the Periodic Table) metal component and a Group VIII (of the Periodic Table) metal component. The most commonly employed Group VIB metals are molybdenum and tungsten, while cobalt and nickel are the conventional Group VIII metals. Phosphorus may also be present in the catalyst. The prior art processes for preparing these catalysts are characterized in that a carrier material is composited with hydrogenation metal components, for example by impregnation, after which the composite is calcined to convert the metal components into their oxides. Before being used in hydrotreating, the catalysts are generally presulfided to convert the hydrogenation metals into their sulfides. Processes for activating and regenerating such catalysts are also known.

However, unexpectedly, highly effective catalysts containing a unique combination of both phosphorus and boron have now been discovered. In particular, it has been discovered that surprisingly significant improvement in catalytic activity can be achieved using particular, relatively elevated amounts of both boron and phosphorus components in the catalyst.

Thus, in one embodiment of the invention there is provided a catalyst comprising at least one Group VIB metal component, at least one Group VIII metal component, a phosphorus component, and a boron-containing carrier component, wherein the amount of the phosphorus component is at least 1 wt %, expressed as an oxide ($P_2O_5$) and based on the total weight of the catalyst, and the amount of the boron component is in the range of about 1 to about 13 wt %, expressed as an oxide ($B_2O_3$) and based on the total weight of the catalyst. In a particularly preferred embodiment of the invention, the boron-containing carrier is formed by co-extrusion of a boron source with the carrier.

In another embodiment of the invention, provided is a method of producing a catalyst. The method comprises co-extruding a boron source with a carrier to form a boron-containing carrier extrudate, drying and calcining the extrudate, and impregnating the calcined extrudate with a solution comprised of a phosphorus source, at least one Group VIB metal source and/or at least one Group VIII metal source. Co-extrusion of the boron source has been found to be particularly and surprisingly advantageous when compared to, e.g., preparing the support via impregnation of the boron source. One feature co-extrusion is that it enable use of higher boron concentrations in the carrier and, therefore, the final catalyst. Co-extrusion with the carrier also permits a single calcination of the combined support, rather than multiple calcination steps as in typical impregnation procedures. In the process, the amount of the boron source and the amount of the phosphorus source is sufficient so as to form a catalyst composition at least having a boron content in the range of about 1 wt % to about 13 wt %, expressed as an oxide ($B_2O_3$) and based on the total weight of the catalyst, and a phosphorus content of at least about 1 wt %, expressed as an oxide ($P_2O_5$) and based on the total weight of the catalyst.

In another embodiment of the invention there is provided a catalyst composition formed by the just above-described process. Another embodiment of the invention is a hydrotreating process carried out employing the catalyst composition.

These and still other embodiments, advantages and features of the present invention shall become further apparent from the following detailed description, including the appended claims.

FURTHER DETAILED DESCRIPTION OF THE INVENTION

Unless otherwise indicated, weight percent (wt %) as used herein is the weight percent of the specified form of the substance, based upon the total weight of the product for which the specified substance or form of substance is a constituent or component. It should further be understood that, when describing steps or components or elements as being preferred in some manner herein, they are preferred as of the initial date of this disclosure, and that such preference(s) could of course vary depending upon a given circumstance or future development in the art. Moreover, "boron source" and "boron component" are used herein interchangeably and are synonymous with one another. Also, the term "boron-containing carrier" is intended to refer to any carrier as specified herein which has been contacted with a boron source prior to drying and calcining, and preferably "contacted" in this context shall encompass mixing, and in particular, co-extrusion.

The Group VIB metal component in catalysts of the invention is selected from the group consisting of molybdenum, tungsten, chromium and a mixture of two or more of the foregoing, while molybdenum and/or tungsten is typically preferred, and molybdenum is typically more preferred. The Group VIII metal component is selected from group consisting of iron, cobalt and nickel, while nickel and/or cobalt is typically preferred, and nickel is typically more preferred. Preferred mixtures of metals include a combination of (a) nickel and/or cobalt and (b) molybdenum and/or tungsten. When hydrodesulfurisation (sometimes hereafter referred to as "HDS") activity of the catalyst is important, a combination of cobalt and molybdenum is advantageous and typically preferred. When hydrodenitrogenation (sometimes hereafter referred to as "HDN") activity of the catalyst is important, a combination of nickel and either molybdenum or tungsten is advantageous and typically preferred.

The Group VIB metal component can be an oxide, an oxo acid, or an ammonium salt of an oxo or polyoxo anion. The Group VIB metal compounds are formally in the +6 oxidation state. Oxides and oxo acids are preferred Group VIB metal compounds. Suitable Group VIB metal compounds in the practice of this invention include chromium trioxide, chromic acid, ammonium chromate, ammonium dichromate, molybdenum trioxide, molybdic acid, ammonium molybdate, ammonium para-molybdate, tungsten trioxide, tungstic acid, ammonium tungsten oxide, ammonium metatungstate hydrate, ammonium para-tungstate, and the like. Preferred Group VIB metal compounds include chromium trioxide, molybdenum trioxide, molybdic acid, tungstic acid and tungsten trioxide. Mixtures of any two or more Group VIB metal compounds can be used; a mixture of products will be obtained when compounds having different Group VIB metal are used. The amount of Group VIB metal compound employed in the catalyst will typically be in the range of about 18 to about 28 wt % (as trioxide), based on the total weight of the catalyst, but could be as low as, e.g., 16 wt %. In one embodiment of this invention, the amount of Group VIB metal compound is in the range of about 19 to about 26 wt %, or about 22 to about 26 wt % (as trioxide), based on the total weight of the catalyst.

The Group VIII metal component is usually an oxide, hydroxide or salt, preferably a salt. Suitable Group VIII metal compounds include, but are not limited to, cobalt oxide, cobalt hydroxide, cobalt nitrate, cobalt carbonate, cobalt hydroxy-carbonate, cobalt acetate, cobalt citrate, nickel oxide, nickel hydroxide, nickel nitrate, nickel carbonate, nickel hydroxy-carbonate, nickel acetate, and nickel citrate. Preferred Group VIII metal compounds include cobalt carbonate, cobalt hydroxy-carbonate, nickel hydroxy-carbonate and nickel carbonate. Mixtures of two or more Group VIII metal compounds can be used; when the Group VIII metals of the compounds in the mixture are different, a mixture of products will be obtained. The amount of Group VIII metal compound employed in the catalyst will typically be in the range of about 2 to about 8 wt % (as oxide), based on the total weight of the catalyst. In a preferred embodiment of this invention, the amount of Group VIII metal compound is in the range of about 3 to about 6 wt % (as oxide), based on the total weight of the catalyst.

In the practice of this invention, the phosphorus component is a compound which is typically a water soluble, acidic phosphorus compound, particularly an oxygenated inorganic phosphorus-containing acid. Examples of suitable phosphorus compounds include metaphosphoric acid, pyrophosphoric acid, phosphorous acid, orthophosphoric acid, triphosphoric acid, tetraphosphoric acid, and precursors of acids of phosphorus, such as ammonium hydrogen phosphates (mono-ammonium di-hydrogen phosphate, di-ammonium mono-hydrogen phosphate, tri-ammonium phosphate). Mixtures of two or more phosphorus compounds can be used. The phosphorus compound may be used in liquid or solid form. A preferred phosphorus compound is orthophosphoric acid ($H_3PO_4$) or an ammonium hydrogen phosphate, preferably in aqueous solution. The amount of phosphorus compound employed in the catalyst will be sufficient to provide at least about 1 wt % (as oxide $P_2O_5$), based on the total weight of the catalyst, or in another aspect of the invention, at least about 2 wt % (as oxide $P_2O_5$), based on the total weight of the catalyst. In another aspect, the amount of phosphorus compound employed will be sufficient to provide phosphorus in the range of about 4 to about 10 wt % (as oxide $P_2O_5$), based on the total weight of the catalyst. In another aspect of this invention, the amount of phosphorus compound employed is sufficient to provide phosphorus in the range of about 4 to about 7 wt % (as oxide $P_2O_5$), based on the total weight of the catalyst.

The boron component will typically be meta-boric acid ($HBO_2$), ortho-boric acid ($H_3BO_3$), ammonium borate tetrahydrate [$(NH_4)_2B_4O_7 \cdot 4H_2O$], sodium tetra borate, ammonium borate, ammonium tetra borate ($NH_4)_2B_4O_7$, boric oxide ($B_2O_3$), various mono-, di- and tri-alkyl amine borates (e.g., triethanol amine borate), ammonium tetra phenyl borate, or the like. Suitable non-limiting examples of the boron component include ortho-boric acid ($H_3BO_3$) and ammonium tetra borate tetra-hydrate [$(NH_4)_2B_4O_7 \cdot 4H_2O$] and mixtures of two or more of the foregoing. The amount of the boron component in the catalyst will typically be in the range of about 1 to about 13 wt %, expressed as an oxide ($B_2O_3$) and based on the total weight of the catalyst. In a preferred embodiment of this invention, the amount of boron component is in the range of about 2 wt % to about 8 wt %, expressed as an oxide ($B_2O_3$) and based on the total weight of the catalyst. In another aspect of the invention, the amount of boron component is in the range of about 4 wt % to about 6 wt %, expressed as an oxide ($B_2O_3$) and based on the total weight of the catalyst.

The catalyst carrier may comprise the conventional oxides, e.g., alumina, silica, silica-alumina, alumina with silica-alumina dispersed therein, silica-coated alumina, alumina-coated silica, magnesia, zirconia, and titania, as well as mixtures of these oxides. As a rule, preference is given to the carrier being of alumina, silica-alumina, alumina with silica-alumina dispersed therein, alumina-coated silica or silica-coated alumina. Special preference is given to alumina and alumina containing up to 10 wt % of silica. A carrier containing a transition alumina, for example an eta, theta, or gamma alumina is preferred within this group, wherein a gamma-alumina carrier is most especially preferred. The precursor of the catalyst carrier co-extruded with the boron source of this invention prior to calcination is, for example, boehmite, pseudo-boehmite or the like, and can be in the form of a wet cake or dried (e.g., spray-dried) material.

As noted earlier, it is preferred that the boron component is co-extruded with the carrier component, as it is believed, without being bound to theory, that co-extrusion facilitates use of the higher concentration of boron component employed in the highly active catalyst of this invention. It is further believed, without being bound to theory, that the moment of boron component addition to the carrier for co-extrusion can affect the physical properties of the carrier. It is therefore typically preferred, although not always required or preferred, that addition of the boron component is carried out at the initiation of kneading. The desired properties of the final product may dictate that one add the boron component earlier or later in the kneading process.

The catalyst's pore volume (measured via mercury penetration, contact angle 140°, surface tension of 480 dyn/cm) is not critical to the process according to the invention and will generally be in the range of 0.2 to 2 ml/g, preferably 0.3-1 ml/g. The specific catalyst surface area is not critical to the process according to the invention either and will generally be in the range of 50 to 400 $m^2$/g (measured using the BET method). Preferably, the catalyst will have a median pore diameter in the range of 7-15 nm, as determined by mercury porosimetry, and at least 60% of the total pore volume will be in the range of +−0.2 nm from the median pore diameter.

The catalyst is employed in the conventional manner in the form of, for example, spheres or extrudates. Examples of suitable types of extrudates have been disclosed in the literature (see, int. al., U.S. Pat. No. 4,028,227). Highly suitable for use are cylindrical particles (which may be hollow or not) as well as symmetrical and asymmetrical polylobed particles (2, 3 or 4 lobes).

In forming the catalyst of this invention, the amount of the boron source and the amount of the phosphorus source should be sufficient so as to form a catalyst composition at least having a boron content in the range of about 1 wt % to about 13 wt %, expressed as an oxide ($B_2O_3$) and based on the total weight of the catalyst, and a phosphorus content of at least about 1 wt %, expressed as an oxide ($P_2O_5$) and based on the total weight of the catalyst.

Formation of the catalyst will normally involve at least co-extruding a boron source with a carrier to form a boron-containing carrier extrudate, drying and calcining the extrudate, and impregnating the calcined extrudate with a solution comprised of a phosphorus source, at least one Group VIB metal source and/or at least one Group VIII metal source. Other additives to the solution optionally may be included, such as organic additives such as (i) an organic compound selected from the group consisting of compounds comprising at least two oxygen atoms and 2-10 carbon atoms and the compounds built up from these compounds, or (ii) an organic compound comprising at least one covalently bonded nitrogen atom and at least one carbonyl moiety, or both (i) and (ii). The organic compound under (i) above preferably is selected from the group of compounds comprising at least two oxygen-containing moieties, such as a carboxyl, carbonyl or hydroxyl moiety, and 2-10 carbon atoms, and the compounds built up from these compounds. The latter may be, e.g., the ether, ester, acetal, acid chloride, acid amide, oligomer or polymer of this organic compound. Examples of suitable organic compounds include citric acid, tartaric acid, oxalic acid, malonic acid, malic acid, butanediol, pyruvic aldehyde, glycol aldehyde, and acetaldol. Organic compounds selected from the group of compounds comprising at least two hydroxyl groups and 2-10 carbon atoms per molecule and the compounds built up from these compounds are even more preferred. These include, e.g., tartaric acid, or aliphatic alcohols such as ethylene glycol, propylene glycol, glycerin, trimethylol ethane, trimethylol propane, etc. Compounds built up from these organic compounds include oligo- and polymers, e.g., diethylene glycol, dipropylene glycol, trimethylene glycol, triethylene glycol, tributylene glycol, tetraethylene glycol, tetrapentylene glycol. This range can be extrapolated to include, e.g., polyethers like polyethylene glycol. For this last compound, polyethylene glycol with a molecular weight between 200 and 8,000 is preferred. Other compounds built up from these organic compounds are, e.g., ethers such as ethylene glycol monobutyl ether, diethylene glycol monomethyl ether, diethylene glycol monoethyl ether, diethylene glycol monopropyl ether, and diethylene glycol monobutyl ether. Preferred organic compounds are, int. al., ethylene glycol, diethylene glycol, polyethylene glycol, or mixtures thereof. Another group of organic compounds comprising at least two hydroxyl groups and 2-10 carbon atoms per molecule is formed by, e.g., monosaccharides such as glucose and fructose. Compounds built up from these organic compounds include oligo- and polymers, e.g., disaccharides such as lactose, maltose, and saccharose and polysaccharides.

The organic compound under (ii) preferably comprises at least two carbonyl moieties. It is preferred that at least one carbonyl moiety is present in a carboxyl group. It is furthermore preferred that at least one nitrogen atom is covalently bonded to at least two carbon atoms. A preferred organic compound satisfies formula (I) or (II)

(R1R2)N—R3-N(R1'R2') (I)

N(R1R2R1') (II)

wherein R1, R2, R1' and R2' are independently selected from alkyl, alkenyl, and allyl, with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4-. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) or (II) comprises at least one carbonyl moiety. Preferably, at least two of R1, R2, R1' and R2' (formula (I)) and at least two of R1, R2 and R1' (formula (II)) have the formula —R5-COOX, wherein R5 is an alkylene group having 1-4 carbon atoms, and X is hydrogen or another cation, such as an ammonium, sodium, potassium and/or lithium cation. If X is a multivalent cation, one X can adhere to two or more —R5-COO groups. Typical examples of a compound of formula (I) are ethylene diamine(tetra) acetic acid (EDTA), hydroxyethylene diamine triacetic acid, and diethylene triamine pentaacetic acid. A typical example of a compound of formula (II) is nitrilotriacetic acid (NTA).

The co-extrusion is carried out by adding the boron component to the alumina precursor component during the kneading step. The moment of addition is not fixed. The boron component is added as a solid/solution. During the kneading step, the mix is heated to a desired temperature to remove any excess of solvent/water if needed. Kneading is finished when the desired moisture content (as determined by Loss on Ignition at a temperature in the range of 500-600° C.) is reached. Next, the mix is shaped to extrudates by using a suitable shaping technique. This technique can be extrusion, palletizing or pressing.

The extrudate so formed is then dried at a temperature in the range of 80°-200° C. to remove a substantial amount of solvent/water and then calcined under air or inert conditions with or without steam at a temperature normally in the range of 400°-900° C., resulting in the case of alumina, in a carrier containing a transition alumina e.g., a gamma, theta or eta-alumina, although a temperature outside of the latter range is possible, depending upon the support material employed. The calcination can be in a static or rotating mode. As will now be known by those of skill in the art, the drying times and calcining times employed can vary significantly depending upon various factors, including without limitation the temperature ramp rate, if any, and the types and amounts of materials present, but in all cases should be sufficient to remove volatiles to the extent desired, or to permit desired reactions to sufficiently take place. Typical drying time will be, e.g., at least 30 minutes at the maximum drying temperature, and typical calcining time will be, e.g., at least 30 minutes at the maximum calcining temperature.

The calcined extrudate is then impregnated with a solution comprising the phosphorous source, a Group VIB metal source and/or a Group VIII metal source. Impregnation is carried out by pore volume impregnation with a impregnation solution comprising the selected additives in an appropriate solvent. The solvent used in preparing the additive impregnation solution is generally water, although other components such as methanol, ethanol and other alcohols may also be suitable. Impregnation can be carried out at room temperature or at elevated temperatures. Instead of impregnating techniques, dipping methods, spraying methods, etc can be used. After impregnation, an optional drying step at a temperature in the range of 25-220° C. is carried out. In another embodiment of the invention, when no organic additive has been incorporated to produce the final catalyst, the impregnated calcined extrudate can optionally be again calcined at a temperature in the range of about 250 to about 700° C. until a desired Loss on Ignition is reached.

Optionally, catalysts of the invention may be subjected to a sulfidation step (treatment) to convert the metal components to their sulfides. In the context of the present specification, the phrases "sulfiding step" and "sulfidation step" are meant to include any process step in which a sulfur-containing compound is added to the catalyst composition and in which at least a portion of the hydrogenation metal components present in the catalyst is converted into the sulfidic form, either directly or after an activation treatment with hydrogen. Suitable sulfidation processes are known in the art. The sulfidation step can take place ex situ to the reactor in which the catalyst is to be used in hydrotreating hydrocarbon feeds, in situ, or in a combination of ex situ and in situ to the reactor.

Ex situ sulfidation processes take place outside the reactor in which the catalyst is to be used in hydrotreating hydrocarbon feeds. In such a process, the catalyst is contacted with a sulfur compound, e.g., a polysulfide or elemental sulfur, outside the reactor and, if necessary, dried. In a second step, the material is treated with hydrogen gas at elevated temperature in the reactor, optionally in the presence of a feed, to activate the catalyst, i.e., to bring the catalyst into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulphiding agent, such as hydrogen sulfide or a compound which under the prevailing conditions is decomposable into hydrogen sulphide. It is also possible to use a hydrogen gas stream combined with a hydrocarbon feed comprising a sulfur compound which under the prevailing conditions is decomposable into hydrogen sulfide. In the latter case, it is possible to sulfide the catalyst by contacting it with a hydrocarbon feed comprising an added sulfiding agent (spiked hydrocarbon feed), and it is also possible to use a sulfur-containing hydrocarbon feed without any added sulfiding agent, since the sulfur components present in the feed will be converted into hydrogen sulfide in the presence of the catalyst. Combinations of the various sulfiding techniques may also be applied. The use of a spiked hydrocarbon feed may be preferred.

The catalyst compositions of this invention are those produced by the above-described process, whether or not the process included an optional sulfiding step.

The formed catalyst product of this invention is suitable for use in hydrotreating, hydrodenitrogenation and/or hydrodesulfurization (also collectively referred to herein as "hydrotreating") of hydrocarbon feed stocks when contacted by the catalyst under hydrotreating conditions. Such hydrotreating conditions are temperatures in the range of 250°-450° C., pressure in the range of 5-250 bar, liquid space velocities in the range of 0.1-10 liter/hour and hydrogen/oil ratios in the range of 50-2000 Nl/l. Examples of suitable hydrocarbon feeds to be so treated vary widely, and include middle distillates, kero, naphtha, vacuum gas oils, heavy gas oils, and the like.

The following describes experimental preparation of the support and the catalyst, as well as use of the catalyst in hydrotreating a hydrocarbon feedstock to illustrate activity of the catalysts so formed. This information is illustrative only, and is not intend to limit the invention in any way.

EXAMPLES

Activity Test

The activity test was carried out in a micro flow reactor. Light Gas Oil (LGO) spiked with dimethyl disulfide (DMDS) (total S content of 3.6 wt %) was used for presulphiding, Heavy Gas Oil (HGO), having a S content of 1.6 wt. % and N content of 1050 ppm, Vacuum Gas Oil (VGO), having a S content of 1.8 wt. % and N content of 1152 ppm and Light Gas Oil (LGO), having a S content of 1.2 wt. % and a N content of 94 ppm, were used for testing. Detailed information about feed and test condition is given in Tables 1-5.

The relative weight activities for the various catalysts were determined as follows. For each catalyst the reaction constant k wt was calculated from the following formula:

$$k\ wt = WHSV*1/(n-1) \times (1/S^{n-1} \times 1/S_0^{n-1})$$

in which the S stands for percentage of sulfur in the product and $S_0$ for the percentage of sulfur in the feed, and n stands for the reaction order of the hydrodesulfurisation reaction. For HC-PT and FCC-PT mode a n of 1.75 was used. For ULSD a n of 1.2 was used For nitrogen the k wt was calculated from the following formula:

$$kwt = \ln(N_0/N)*WHSV$$

in which the N stands for the nitrogen content in the product and $N_0$ for the nitrogen content in the feed.

In the tables, S=sulfur, N=nitrogen, ToS=time on stream, LHSV=liquid hourly space velocity, IBP=initial boiling point, FBP=final boiling point.

TABLE 1

Feed properties

| Feed | wt % S | ppm N | Density (g/ml) | IBP (° C.) | FBP (° C.) |
|---|---|---|---|---|---|
| HGO | 1.578 | 1050 | 0.9443 (@ 15.5 C.) | 139 | 482 |
| VGO | 1.763 | 1152 | 0.9221 (@ 15.5 C.) | 265 | 600 |
| LGO | 1.167 | 94 | 0.8366 (@ 15.5 C.) | 114 | 420 |

Presulfiding/Testing Conditions

TABLE 2

Test conditions HC-PT test, Feed HGO.

| | Presulphiding | Testing |
|---|---|---|
| Temperature (° C.) | 320 | 345 |
| H2 pressure (bar) | 45 | 100 |
| LHSV | 3 | 2.75 |
| H2/oil | 300 | 1000 |
| Time (hours) | 27.5 | * |

Feed LGO spiked with DMDS (total S content of 3.6 wt %) was used for presulphiding.
* Time on stream is reported in the text of the examples.

TABLE 3

Test conditions HC-PT test, Feed VGO.

| | Presulphiding | Testing |
|---|---|---|
| Temperature (° C.) | 340 | 382 |
| H2 pressure (bar) | 30 | 120 |
| LHSV | 3 | 1.75 |
| H2/oil | 300 | 1000 |
| Time (hours) | 27.5 | * |

Feed LGO spiked with DMDS (total S content of 3.6 wt %) was used for presulphiding.
* Time on stream is reported in the text of the examples.

TABLE 4

Test conditions FCC-PT test, Feed VGO.

| | Presulphiding | Testing |
|---|---|---|
| Temperature (° C.) | 320 | 360 |
| H2 pressure (bar) | 45 | 70 |
| LHSV | 3 | 1.2 |
| H2/oil | 300 | 400 |
| Time (hours) | 16 | * |

Feed LGO spiked with DMDS (total S content of 3.6 wt %) was used for presulphiding.
* Time on stream is reported in the text of the examples.

TABLE 5

Test conditions ULSD test, Feed LGO.

| | Presulphiding | Testing |
|---|---|---|
| Temperature (° C.) | 320 | 340 |
| H2 pressure (bar) | 45 | 45 |
| LHSV | 3 | 2 |
| H2/oil | 300 | 300 |
| Time (hours) | 27.1 | * |

Feed LGO spiked with DMDS (total S content of 3.6 wt %) was used for presulphiding.
* Time on stream is reported in the text of the examples.

Support Preparation (0-18.75 Wt % $B_2O_3$ in Support)

The support was prepared by mixing an alumina hydrate cake (water content about 80%) and boric acid ($H_3BO_3$) in a kneader to form an extrudable paste. (In some cases, the water content of the extrusion mix had to be adjusted by evaporation or by adding additional water in order to obtain a paste suitable for extrusion. A person skilled in the art knows how to adjust the water content in order to obtain an extrudable paste.) The resulting mixture was extruded through a 1.3 Q die plate, dried overnight at 120° C. and then calcined (optionally with steam) at a temperature in the range of 475-850° C. (See Table 6).

Support D3 was prepared from A1 and supports B2, C3 and D4 were prepared from A6 by pore volume impregnation of the support A1 and A6, respectively, with a solution of ammonium tetra borate tetrahydrate (($NH_4$)$_2B_4O_7 \cdot 4H_2O$) in water. The impregnated support was heated to a temperature of 120° C., kept at this temperature for 30 minutes and subsequently calcined (optionally with steam) at a temperature in the range of 475-550° C. for 1 hour (See Table 6).

TABLE 6

Calcination temperature of the supports A-H

| Support | $B_2O_3$ (wt %) | Calcination Temperature (° C.) |
|---|---|---|
| A1 | 0 | 475 |
| A2 | 0 | 600 |
| A3 | 0 | 750 |
| A4 | 0 | 840 |
| A5 | 0 | 720 |
| A6 | 0 | 550 |
| B1 | 1.88 | 700 |
| B2 | 1.88 | 550 |
| C1 | 3.75 | 700 |
| C2 | 3.75 | 680 |
| C3 | 3.75 | 550 |
| D1 | 7.5 | 760 |
| D2 | 7.5 | 800 |
| D3 | 7.5 | 475 |
| D4 | 7.5 | 550 |
| E1 | 9.8 | 650 |
| E2 | 9.8 | 750 |
| E3 | 9.8 | 550 |
| F1 | 11.25 | 810 |
| F2 | 11.25 | 760 |
| G1 | 15 | 850 |
| H1 | 18.75 | 750 |

Preparation and Testing of Catalysts 1-44

All chemical compositions of the catalysts are calculated on basis of the amount of material used for the catalyst preparation.

Example 1

NiMoP Catalyst 1

The impregnation solution was prepared by mixing appropriate amounts of water, nickel carbonate [$Ni(OH)_x(CO_3)_y$], molybdenum trioxide ($MoO_3$), and phosphoric acid ($H_3PO_4$). The mixture was sufficiently heated and kept at temperature while stirred until a clear solution was obtained. After the solution was cooled down, diethylene glycol (0.44 mol/mol hydrogenation metals present in the catalyst) was added. The initial amount of water was chosen in a way that the total volume of the solution after the addition of diethylene glycol was ca. 230% of the pore volume for the impregnation of the powdered support A4.

Support A4 was crushed, sieved and impregnated with the impregnation solution to 230% pore volume saturation. The impregnated powder was dried 10 hours at 80° C. and subsequently for 4 hours at 120° C. The final $MoO_3$ content was 24 wt % (dry base) of the finished catalyst. The final NiO content was 4 wt % (dry base) of the finished catalyst. The final $P_2O_5$ content was 2 wt % (dry base) of the finished catalyst.

The catalyst was tested in HC-PT mode with HGO feed and reached a product S of 1026 ppm (k wt=21.05) and product N of 80 ppm (k wt=8.38) after 144 hours time on stream. Results are on basis of averaged duplicate measurements.

Example 2

NiMoPB Catalyst 2

The powdered catalyst was prepared as described in Example 1, except that support D1 was used and the final $B_2O_3$ content was 5.3 wt % (dry base) of the finished catalyst.

The catalyst was tested in HC-PT mode with HGO feed and reached a product S of 976 ppm (k wt=21.76) and product N of 29 ppm (k wt=11.54) after 144 hours time on stream. Results are on basis of averaged duplicate measurements.

Example 3

NiMoPB Catalyst 3

The powdered catalyst was prepared as described in Example 1, except that support G1 was used and that the final $B_2O_3$ content was 10.5 wt % (dry base) of the finished catalyst.

The catalyst was tested in HC-PT mode with HGO feed and reached a product S of 995 ppm (k wt=21.11) and product N of 23 ppm (k wt=12.24) after 144 hours time on stream. Results are on basis of averaged duplicate measurements.

Example 4

NiMoP Catalyst 4

The powdered catalyst was prepared as described in Example 1, except that the final $P_2O_5$ content was 4.5 wt % (dry base) of the finished catalyst.

The catalyst was tested in HC-PT mode with HGO feed and reached a product S of 902 ppm (k wt=23.10) and product N of 44 ppm (k wt=10.18) after 144 hours time on stream. Results are on basis of averaged duplicate measurements.

Example 5

NiMoPB Catalyst 5

The powdered catalyst was prepared as described in Example 4, except that support C1 was used and that the final $B_2O_3$ content was 2.5 wt % (dry base) of the finished catalyst.

The catalyst was tested in HC-PT mode with HGO feed and reached a product S of 910 ppm (k wt=21.90) and product N of 18 ppm (k wt=11.75) after 144 hours time on stream. Results are on basis of averaged duplicate measurements.

Example 6

NiMoPB Catalyst 6

The powdered catalyst was prepared as described in Example 4, except that support D1 was used and that the final $B_2O_3$ content was 5.1 wt % (dry base) of the finished catalyst.

The catalyst was tested in HC-PT mode with HGO feed and reached a product S of 926 ppm (k wt=22.31) and product N of 16 ppm (k wt=12.70) after 144 hours time on stream. Results are on basis of averaged duplicate measurements.

Example 7

NiMoPB Catalyst 7

The powdered catalyst was prepared as described in Example 4, except that support F1 was used and that the final $B_2O_3$ content was 7.6 wt % (dry base) of the finished catalyst.

The catalyst was tested in HC-PT mode with HGO feed and reached a product S of 1137 ppm (k wt=18.18) and product N of 16 ppm (k wt=12.70) after 144 hours time on stream. Results are on basis of averaged duplicate measurements.

Example 8

NiMoPB Catalyst 8

The powdered catalyst was prepared as described in Example 4, except that support G1 was used and that the final $B_2O_3$ content was 10.1 wt % (dry base) of the finished catalyst.

The catalyst was tested in HC-PT mode with HGO feed and reached a product S of 998 ppm (k wt=21.33) and product N of 23 ppm (k wt=12.43) after 144 hours time on stream. Results are on basis of averaged duplicate measurements.

Example 9

NiMoP Catalyst 9

The powdered catalyst was prepared as described in Example 1, except that the final $P_2O_5$ content was 7 wt % (dry base) of the finished catalyst.

The catalyst was tested in HC-PT mode with 1-100 feed and reached a product S of 1069 ppm (k wt=20.62) and product N of 34 ppm (k wt=10.57) after 144 hours time on stream. Results are on basis of averaged duplicate measurements.

Catalyst 9 was also prepared as whole extrudates, following the preparation procedure as described above, except that the total volume of the impregnation solution after the addition of di ethylene glycol was ca. 110% of the pore volume for the impregnation of extrudates support A4 and that the support was impregnated with the impregnation solution to 110% pore volume saturation.

Extrudates of catalyst 9 were tested in HC-PT mode with HGO feed (product S of 653 ppm (k wt=28.74) and product N of 26 ppm (k wt=11.49) after 192 hours time on stream), in HC-PT mode with VGO feed (product S of 583 ppm (k wt=19.84) and product N of 155 ppm (k wt=4.01) after 300 hours time on stream) and in FCC-PT mode with VGO feed (product S of 2022 ppm (k wt=4.72) and product N of 557 ppm (k wt=0.97) after 174 hours time on stream).

Example 10

NiMoPB Catalyst 10

The powdered catalyst was prepared as described in Example 9, except that support C1 was used and that the final $B_2O_3$ content was 2.4 wt % (dry base) of the finished catalyst.

The catalyst was tested in HC-PT mode with 1-100 feed and reached a product S of 964 ppm (k wt=20.97) and product N of 18 ppm (k wt=11.21) after 144 hours time on stream. Results are on basis of averaged duplicate measurements.

Catalyst 10 was also prepared as whole extrudates, following the preparation procedure as described above, except that the total volume of the impregnation solution after the addition of di ethylene glycol was ca. 110% of the pore volume for the impregnation of extrudates support C1 and that the support was impregnated with the impregnation solution to 110% pore volume saturation.

Extrudates of catalyst 10 were tested in HC-PT mode with HGO feed (product S of 438 ppm (k wt=41.57) and product N of 12 ppm (k wt=14.26) after 192 hours time on stream) and in HC-PT mode with VGO feed (product S of 304 ppm (k wt=32.40) and product N of 92 ppm (k wt=4.65) after 300 hours time on stream).

Example 11

NiMoPB Catalyst 11

The powdered catalyst was prepared as described in Example 9, except that support D1 was used and that the final $B_2O_3$ content was 4.9 wt % (dry base) of the finished catalyst.

The catalyst was tested in HC-PT mode with HGO feed and reached a product S of 799 ppm (k wt=25.59) and product N of 11 ppm (k wt=14.17) after 144 hours time on stream. Results are on basis of averaged duplicate measurements.

Catalyst 11 was also prepared as whole extrudates, following the preparation procedure as described above, except that the total volume of the impregnation solution after the addition of di ethylene glycol was ca. 110% of the pore volume for the impregnation of extrudates support D1 and that the support was impregnated with the impregnation solution to 110% pore volume saturation.

Extrudates of catalyst 11 were tested in HC-PT mode with HGO feed (product S of 349 ppm (k wt=47.72) and product N of 8 ppm (k wt=14.93) after 192 hours time on stream), in HC-PT mode with VGO feed (product S of 300 ppm (k wt=31.84) and product N of 80 ppm (k wt=4.82) after 300 hours time on stream) and in FCC-PT mode with VGO feed (product S of 1805 ppm (k wt=5.46) and product N of 463 ppm (k wt=1.26) after 174 hours time on stream).

Example 12

NiMoPB Catalyst 12

The powdered catalyst was prepared as described in Example 9, except that support F1 was used and that the final $B_2O_3$ content was 7.3 wt % (dry base) of the finished catalyst.

The catalyst was tested in HC-PT mode with HGO feed and reached a product S of 1190 ppm (k wt=17.52) and product N of 21 ppm (k wt=11.35) after 144 hours time on stream. Results are on basis of averaged duplicate measurements.

Example 13

NiMoPB Catalyst 13

The powdered catalyst was prepared as described in Example 9, except that support G1 was used and that the final $B_2O_3$ content was 9.8 wt % (dry base) of the finished catalyst.

The catalyst was tested in HC-PT mode with HGO feed and reached a product S of 1043 ppm (k wt=20.21) and product N of 26 ppm (k wt=11.81) after 144 hours time on stream. Results are on basis of averaged duplicate measurements.

Example 14

NiMoPB Catalyst 14

The powdered catalyst was prepared as described in Example 1, except that support F1 was used and that the final $P_2O_5$ content was 9.5 wt % (dry base) and the final $B_2O_3$ content was 7.0 wt % (dry base) of the finished catalyst.

The catalyst was tested in HC-PT mode with HGO feed and reached a product S of 1370 ppm (k wt=15.59) and product N of 30 ppm (k wt=11.48) after 144 hours time on stream. Results are on basis of averaged duplicate measurements.

Example 15

NiMoPB Catalyst 15

The catalyst was prepared as whole extrudates as described in Example 9, except that support B1 was used and that the final $P_2O_5$ content was 1.5 wt % (dry base) and the final $B_2O_3$ content was 1.3 wt % (dry base) of the finished catalyst.

The catalyst was crushed and sieved, prior to the activity test. The powdered catalyst was tested in FCC-PT mode with VGO feed and reached a product S of 1220 ppm (k wt=8.06) and product N of 509 ppm (k wt=1.18) after 120 hours time on stream. Results are on basis of averaged duplicate measurements.

Example 16

NiMoPB Catalyst 16

The powdered catalyst was prepared as described in Example 1, except that support C2 was used and that the final $MoO_3$ content was 19 wt % (dry base), the final $P_2O_5$ content was 4 wt % (dry base) and the final $B_2O_3$ content was 2.7 wt % (dry base) of the finished catalyst.

The catalyst was tested in FCC-PT mode with VGO feed and reached a product S of 1481 ppm (k wt=6.48) and product N of 545 ppm (k wt=1.03) after 144 hours time on stream. Results are on basis of averaged duplicate measurements.

Example 17

NiMoPB Catalyst 17

The powdered catalyst was prepared as described in Example 16, except that support F2 was used and that the final $B_2O_3$ content was 8.2 wt % (dry base) of the finished catalyst.

The catalyst was tested in FCC-PT mode with VGO feed and reached a product S of 1616 ppm (k wt=6.06) and product N of 521 ppm (k wt=1.11) after 144 hours time on stream. Results are on basis of averaged duplicate measurements.

Example 18

NiMoP Catalyst 18

The catalyst was prepared as whole extrudates as described in Example 9, except that support A1 was used and that the final $P_2O_5$ content was 4.5 wt % (dry base) of the finished catalyst.

The catalyst was crushed and sieved, prior to the activity test. The powdered catalyst was tested in FCC-PT mode with VGO feed and reached a product S of 1216 ppm (k wt=7.03) and product N of 455 ppm (k wt=1.16) after 120 hours time on stream. Results are on basis of averaged duplicate measurements.

Example 19

NiMoPB Catalyst 19

The catalyst was prepared as whole extrudates as described in Example 18, except that support B1 was used and that the final $B_2O_3$ content was 1.3 wt % (dry base) of the finished catalyst.

The catalyst was crushed and sieved, prior to the activity test. The powdered catalyst was tested in FCC-PT mode with VGO feed and reached a product S of 1230 ppm (k wt=7.85) and product N of 473 ppm (k wt=1.26) after 120 hours time on stream.

Example 20

NiMoPB Catalyst 20

The catalyst was prepared as whole extrudates as described in Example 18, except that support B2 was used and that the final $B_2O_3$ content was 1.3 wt % (dry base) of the finished catalyst.

The catalyst was crushed and sieved, prior to the activity test. The powdered catalyst was tested in FCC-PT mode with VGO feed and reached a product S of 1115 ppm (k wt=7.33) and product N of 413 ppm (k wt=1.25) after 120 hours time on stream. Results are on basis of averaged duplicate measurements.

Example 21

NiMoPB Catalyst 21

The catalyst was prepared as whole extrudates as described in Example 9, except that support C1 was used and that the final $MoO_3$ content was 26 wt % (dry base), the final NiO content was 5 wt % (dry base), the final $P_2O_5$ content was 4.5 wt % (dry base) and the final $B_2O_3$ content was 2.4 wt % (dry base) of the finished catalyst.

The catalyst was crushed and sieved, prior to the activity test. The powdered catalyst was tested in FCC-PT mode with VGO feed and reached a product S of 1407 ppm (k wt=6.63) and product N of 452 ppm (k wt=1.26) after 120 hours time on stream.

Example 22

NiMoPB Catalyst 22

The catalyst was prepared as whole extrudates as described in Example 9, except that support C1 was used and that the final $MoO_3$ content was 22 wt % (dry base), the final NiO content was 3 wt % (dry base), the final $P_2O_5$ content was 4.5 wt % (dry base) and the final $B_2O_3$ content was 2.6 wt % (dry base) of the finished catalyst.

The catalyst was crushed and sieved, prior to the activity test. The powdered catalyst was tested in FCC-PT mode with VGO feed and reached a product S of 1664 ppm (k wt=6.14) and product N of 507 ppm (k wt=1.19) after 120 hours time on stream. Results are on basis of averaged duplicate measurements.

Example 23

NiMoPB Catalyst 23

The catalyst was prepared as whole extrudates as described in Example 22, except that support C1 was used and that the final NiO content was 5 wt % (dry base) of the finished catalyst.

The catalyst was crushed and sieved, prior to the activity test. The powdered catalyst was tested in FCC-PT mode with VGO feed and reached a product S of 1282 ppm (k wt=7.87) and product N of 455 ppm (k wt=1.37) after 120 hours time on stream.

Example 24

NiMoPB Catalyst 24

The catalyst was prepared as whole extrudates as described in Example 23, except that support C3 was used.

The catalyst was crushed and sieved, prior to the activity test. The powdered catalyst was tested in FCC-PT mode with VGO feed and reached a product S of 1231 ppm (k wt=7.08) and product N of 429 ppm (k wt=1.26) after 120 hours time on stream. Results are on basis of averaged duplicate measurements.

Example 25

NiMoPB Catalyst 25

The catalyst was prepared as whole extrudates as described in Example 18, except that support D3 was used and that the final $B_2O_3$ content was 5.1 wt % (dry base) of the finished catalyst.

The catalyst was crushed and sieved, prior to the activity test. The powdered catalyst was tested in FCC-PT mode with VGO feed and reached a product S of 1488 ppm (k wt=5.62) and product N of 406 ppm (k wt=1.25) after 120 hours time on stream. Results are on basis of averaged duplicate measurements.

Example 26

NiMoPB Catalyst 26

The catalyst was prepared as whole extrudates as described in Example 25, except that support D2 was used.

The catalyst was crushed and sieved, prior to the activity test. The powdered catalyst was tested in FCC-PT mode with VGO feed and reached a product S of 1429 ppm (k wt=6.60) and product N of 419 ppm (k wt=1.37) after 120 hours time on stream. Results are on basis of averaged duplicate measurements.

Example 27

NiMoPB Catalyst 27

The catalyst was prepared as whole extrudates as described in Example 25, except that support H1 was used and that the final $B_2O_3$ content was 12.7 wt % (dry base) of the finished catalyst.

The catalyst was crushed and sieved, prior to the activity test. The powdered catalyst was tested in FCC-PT mode with VGO feed and reached a product S of 1646 ppm (k wt=5.66) and product N of 436 ppm (k wt=1.28) after 120 hours time on stream. Results are on basis of averaged duplicate measurements.

Example 28

NiMoPB Catalyst 28

The powdered catalyst was prepared as described in Example 1, except that support D1 was used and that the final $MoO_3$ content was 19 wt % (dry base), the final $P_2O_5$ content was 6.5 wt % (dry base) and the final $B_2O_3$ content was 5.3 wt % (dry base) of the finished catalyst.

The catalyst was tested in FCC-PT mode with VGO feed and reached a product S of 1473 ppm (k wt=6.09) and product N of 520 ppm (k wt=1.02) after 144 hours time on stream. Results are on basis of averaged duplicate measurements.

Example 29

NiMoPB Catalyst 29

The powdered catalyst was prepared as described in Example 28, except that support F2 was used and that the final $B_2O_3$ content was 7.9 wt % (dry base) of the finished catalyst.

The catalyst was tested in FCC-PT mode with VGO feed and reached a product S of 1659 ppm (k wt=5.51) and product N of 486 ppm (k wt=0.94) after 144 hours time on stream. Results are on basis of averaged duplicate measurements.

Example 30

NiMoP Catalyst 30

The catalyst was prepared as whole extrudates as described in Example 9, except that support A3 was used.

The catalyst was crushed and sieved, prior to the activity test. The powdered catalyst was tested in FCC-PT mode with VGO feed and reached a product S of 1597 ppm (k wt=5.50) and product N of 483 ppm (k wt=1.09) after 120 hours time on stream. Results are on basis of averaged duplicate measurements.

Example 31

NiMoPB Catalyst 31

The catalyst was prepared as whole extrudates as described in Example 9, except that support C1 was used and that the final $MoO_3$ content was 22 wt % (dry base), the final NiO content was 5 wt % (dry base), the final $P_2O_5$ content was 7 wt % (dry base) and the final $B_2O_3$ content was 2.5 wt % (dry base) of the finished catalyst.

The catalyst was crushed and sieved, prior to the activity test. The powdered catalyst was tested in FCC-PT mode with VGO feed and reached a product S of 1206 ppm (k wt=7.81) and product N of 415 ppm (k wt=1.41) after 120 hours time on stream. Results are on basis of averaged duplicate measurements.

Example 32

NiMoPB Catalyst 32

The catalyst was prepared as whole extrudates as described in Example 31, except that support C3 was used.

The catalyst was crushed and sieved, prior to the activity test. The powdered catalyst was tested in FCC-PT mode with VGO feed and reached a product S of 1272 ppm (k wt=6.70) and product N of 416 ppm (k wt=1.27) after 120 hours time on stream. Results are on basis of averaged duplicate measurements.

Example 33

NiMoPB Catalyst 33

The catalyst was prepared as whole extrudates as described in Example 9, except that support D2 was used and that the final $B_2O_3$ content was 4.9 wt % (dry base) of the finished catalyst.

The catalyst was crushed and sieved, prior to the activity test. The powdered catalyst was tested in FCC-PT mode with VGO feed and reached a product S of 1313 ppm (k wt=6.56) and product N of 408 ppm (k wt=1.42) after 120 hours time on stream.

Example 34

NiMoPB Catalyst 34

The catalyst was prepared as whole extrudates as described in Example 33, except that support D4 was used.

The catalyst was crushed and sieved, prior to the activity test. The powdered catalyst was tested in FCC-PT mode with VGO feed and reached a product S of 1275 ppm (k wt=6.44) and product N of 391 ppm (k wt=1.30) after 120 hours time on stream. Results are on basis of averaged duplicate measurements.

Example 35

NiMoPB Catalyst 35

The catalyst was prepared as whole extrudates as described in Example 34, except that support H1 was used and that the final $B_2O_3$ content was 12.2 wt % (dry base) of the finished catalyst.

The catalyst was crushed and sieved, prior to the activity test. The powdered catalyst was tested in FCC-PT mode with VGO feed and reached a product S of 1592 ppm (k wt=5.62) and product N of 430 ppm (k wt=1.25) after 120 hours time on stream. Results are on basis of averaged duplicate measurements.

Example 36

NiMoPB Catalyst 36

The powdered catalyst was prepared as described in Example 1, except that support C2 was used and that the final $MoO_3$ content was 19 wt % (dry base), the final $P_2O_5$ content was 9 wt % (dry base) and the final $B_2O_3$ content was 2.6 wt % (dry base) of the finished catalyst.

The catalyst was tested in FCC-PT mode with VGO feed and reached a product S of 1575 ppm (k wt=5.85) and product N of 533 ppm (k wt=1.01) after 144 hours time on stream. Results are on basis of averaged duplicate measurements.

Example 37

NiMoPB Catalyst 37

The powdered catalyst was prepared as described in Example 36, except that support D1 was used and that the final $B_2O_3$ content was 5.1 wt % (dry base) of the finished catalyst.

The catalyst was tested in FCC-PT mode with VGO feed and reached a product S of 1607 ppm (k wt=5.62) and product N of 559 ppm (k wt=0.93) after 144 hours time on stream. Results are on basis of averaged duplicate measurements.

Example 38

NiMoPB Catalyst 38

The impregnation solution was prepared by mixing appropriate amounts of water, nickel carbonate [$Ni(OH)_x(CO_3)_y$], molybdenum trioxide ($MoO_3$), and phosphoric acid ($H_3PO_4$). The mixture was sufficiently heated and kept at temperature while stirred until a clear solution was obtained. The initial amount of water was chosen in a way that the total volume of the solution was ca. 230% of the pore volume for the impregnation of the powdered support C2.

Support C2 was crushed, sieved and impregnated with the impregnation solution to 230% pore volume saturation. The impregnated powder was dried for 10 hours at 80° C. and subsequently 4 hours at 120° C. Next, the dried catalyst was calcined for 1 hour at 480° C. The final $MoO_3$ content was 19 wt % (dry base) of the finished catalyst. The final NiO content was 4 wt % (dry base) of the finished catalyst. The final $P_2O_5$ content was 4 wt % (dry base) of the finished catalyst. The final $B_2O_3$ content was 2.7 wt % (dry base) of the finished catalyst.

The catalyst was tested in FCC-PT mode with VGO feed and reached a product S of 1396 ppm (k wt=6.33) and product N of 448 ppm (k wt=1.20) after 144 hours time on stream. Results are on basis of averaged duplicate measurements.

Example 39

NiMoP Catalyst 39

The powdered catalyst was prepared as described in Example 38, except that support A5 was used and that the final $P_2O_5$ content was 6.5 wt % (dry base) of the finished catalyst.

The catalyst was tested in FCC-PT mode with VGO feed and reached a product S of 1191 ppm (k wt=8.18) and product N of 556 ppm (k wt=1.05) after 144 hours time on stream. Results are on basis of averaged duplicate measurements.

Example 40

NiMoPB Catalyst 40

The powdered catalyst was prepared as described in Example 38, except that support C2 was used and that the final $P_2O_5$ content was 6.5 wt % (dry base) of the finished catalyst.

The catalyst was tested in FCC-PT mode with VGO feed and reached a product S of 1576 ppm (k wt=5.52) and product N of 468 ppm (k wt=1.12) after 144 hours time on stream. Results are on basis of averaged duplicate measurements.

Example 41

CoMoP Catalyst 41

The extrudate catalyst was prepared as described in Example 9, except that nickel carbonate was replaced by cobalt carbonate ($CoCO_3$) and that support A2 was used. The final $MoO_3$ content was 24 wt % (dry base) of the finished catalyst. The final CoO content was 4.4 wt % (dry base) of the finished catalyst. The final $P_2O_5$ content was 2.1 wt % (dry base) of the finished catalyst.

The catalyst was crushed and sieved, prior to the activity test. The powdered catalyst was tested in ULSD mode with LGO feed and reached a product S of 28.1 ppm (k wt=22.07) and product N of 1.15 ppm (k wt=10.18) after 216 hours time on stream. Results are on basis of averaged duplicate measurements.

Example 42

CoMoPB Catalyst 42

The extrudate catalyst was prepared as described in Example 41, except that support E3 was used and that the final $MoO_3$ content was 25 wt % (dry base), the final CoO content was 6 wt % (dry base) and the final $B_2O_3$ content was 6 wt % (dry base) of the finished catalyst.

The catalyst was crushed and sieved, prior to the activity test. The powdered catalyst was tested in ULSD mode with LGO feed and reached a product S of 11.9 ppm (k wt=24.97) and product N of 0.3 ppm (k wt=12.18) after 216 hours time on stream.

Example 43

CoMoPB Catalyst 43

The extrudate catalyst was prepared as described in Example 41, except that support E2 was used and that the final $MoO_3$ content was 25 wt % (dry base) and the final $B_2O_3$ content was 6.1 wt % (dry base) of the finished catalyst.

The catalyst was crushed and sieved, prior to the activity test. The powdered catalyst was tested in ULSD mode with LGO feed and reached a product S of 11.3 ppm (k wt=24.30) and product N of 0.3 ppm (k wt=11.71) after 216 hours time on stream.

Example 44

CoMoPB Catalyst 44

The extrudate catalyst was prepared as described in Example 41, except that support E1 was used and that the final CoO content was 5 wt % (dry base), the final $P_2O_5$ content was 7.9 wt % (dry base) and the final $B_2O_3$ content was 5.8 wt % (dry base) of the finished catalyst.

The catalyst was crushed and sieved, prior to the activity test. The powdered catalyst was tested in ULSD mode with LGO feed and reached a product S of 11.7 ppm (k wt=25.09) and product N of 0.3 ppm (k wt=12.19) after 216 hours time on stream.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures;

through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A catalyst comprising
at least one Group VIB metal component,
at least one Group VIII metal component comprising nickel and/or cobalt,
a phosphorus component, and
a boron-containing carrier component,
wherein the amount of the phosphorus component is in the range of about 4 wt % to about 10 wt %, expressed as an oxide ($P_2O_5$) and based on the total weight of the catalyst, and the boron content is in the range of about 2 to about 8 wt %, expressed as an oxide ($B_2O_3$) and based on the total weight of the catalyst; and wherein the formation of the catalyst involves at least co-extruding a boron compound with a carrier to form a boron-containing carrier extrudate, drying and calcining the extrudate, and impregnating the calcined extrudate with a solution comprised of a phosphorus source, at least one Group VIB metal source and/or at least one Group VIII metal source.

2. The catalyst according to claim 1 wherein the Group VIB metal component comprises molybdenum.

3. The catalyst according to claim 2 wherein the Group VIII metal component comprises nickel.

4. The catalyst according to claim 2, wherein the Group VIII metal component comprises cobalt.

5. The catalyst according to any of claim 1, 3, or 4, wherein the amount of the phosphorus component is in the range of about 4 wt % to about 7 wt %, expressed as an oxide ($P_2O_5$) and based on the total weight of the catalyst.

6. The catalyst according to claim 5, wherein the boron content is in the range of about 4 wt % to about 6 wt %, expressed as an oxide ($B_2O_3$) and based on the total weight of the catalyst.

7. The catalyst according claim 1, wherein the carrier comprises alumina.

8. The catalyst according to claim 1, wherein the boron compound is selected from the group consisting of meta-boric acid, ortho-boric acid, ammonium borate tetra-hydrate, sodium tetra borate, ammonium borate, ammonium tetra borate, boric oxide, mono-, di- and tri-alkyl amine borate, ammonium tetra phenyl borate, and a mixture of any two or more of the foregoing.

9. The catalyst according to claim 1, further comprising an organic additive.

10. The catalyst according to claim 9, wherein the organic additive is selected from the group consisting of (i) an organic compound selected from the group consisting of (a) organic compounds comprising at least two oxygen atoms and 2-10 carbon atoms, and (b) the ethers, esters, acetals, acid chlorides, acid amides, oligomers and polymers of the organic compounds of (a), and/or (ii) an organic compound comprising at least one covalently bonded nitrogen atom and at least one carbonyl moiety.

11. A method which comprises contacting a hydrocarbon feed with a catalyst according to claim 1 or 10 under hydrotreating conditions so as to hydrotreat the hydrocarbon feed.

12. The catalyst according to claim 10, wherein the organic additive is selected from an organic compound selected from the group consisting of organic compounds comprising at least two oxygen atoms and 2-10 carbon atoms, and the ethers, esters, acetals, acid chlorides, acid amides, oligomers or polymers thereof.

13. The catalyst according to claim 1 wherein the components consist of at least one Group VIB metal component, at least one Group VIII metal component comprising nickel and/or cobalt, a phosphorus component, a boron-containing carrier component, and optionally an organic additive.

14. The catalyst according to claim 13, wherein the organic additive is selected from the group consisting of (i) an organic compound selected from the group consisting of (a) organic compounds comprising at least two oxygen atoms and 2-10 carbon atoms, and (b) the ethers, esters, acetals, acid chlorides, acid amides, oligomers and polymers of the organic compounds of (a), and/or (ii) an organic compound comprising at least one covalently bonded nitrogen atom and at least one carbonyl moiety.

15. A method of producing a catalyst, the method comprising
co-extruding a boron compound with a carrier to form a boron-containing carrier extrudate,
drying and calcining the extrudate, and
impregnating the calcined extrudate with a solution comprised of a phosphorus source, at least one Group VIB metal source and/or at least one Group VIII metal source comprising nickel and/or cobalt,
the amount of the boron compound and the amount of the phosphorus source being sufficient so as to form a catalyst composition at least having a boron content in the range of about 2 wt % to about 8 wt %, expressed as an oxide ($B_2O_3$) and based on the total weight of the catalyst, and a phosphorus content in the range of about 4 wt % to about 10 wt %, expressed as an oxide ($P_2O_5$) and based on the total weight of the catalyst.

16. The method according to claim 15, wherein the amount of the boron compound is sufficient so that the boron content of the catalyst produced is in the range of about 4 wt % to about 6 wt %, expressed as an oxide ($B_2O_3$) and based on the total weight of the catalyst.

17. The method according to claim 15, wherein the amount of the phosphorus source is sufficient so that the phosphorus content of the catalyst is in the range of about 4 wt % to about 7 wt %, expressed as an oxide ($P_2O_5$) and based on the total weight of the catalyst.

18. The method according to claim 15 or 17, further comprising calcining an impregnated calcined extrudate formed in the impregnating step.

19. The method according to either of claim 15 or 17, further comprising drying an impregnated calcined extrudate formed in the impregnation step so as to form a dried impregnated calcined extrudate so as to form the catalyst.

20. The method according to claim 19, wherein the solution further comprises an organic additive.

21. The method of claim 15 or 17, further comprising drying an impregnated calcined extrudate formed in the impregnation step so as to form a dried impregnated calcined extrudate, and further calcining the dried impregnated calcined extrudate so as to form the catalyst.

22. The method according to either of claim 15 or 17, wherein the solution further comprises an organic additive.

23. The method according to claim 22, wherein the organic additive is selected from the group consisting of (i) an organic compound selected from the group consisting of (a) organic compounds comprising at least two oxygen atoms and 2-10 carbon atoms, and (b) the ethers, esters, acetals, acid chlorides, acid amides, oligomers and polymers of the organic compounds of (a), and/or (ii) an organic compound comprising at least one covalently bonded nitrogen atom and at least one carbonyl moiety.

24. A catalyst formed in accordance with either of claim 15 or 17.

25. The method according to claim 15, wherein the components consist of a boron compound, a carrier, and a solution comprised of a phosphorus source, at least one Group VIB metal source, at least one Group VIII metal source comprising nickel and/or cobalt, and optionally an organic additive.

26. The method according to claim 25, wherein the organic additive is selected from the group consisting of (i) an organic compound selected from the group consisting of organic compounds comprising at least two oxygen atoms and 2-10 carbon atoms, and the ethers, esters, acetals, acid chlorides, acid amides, oligomers or polymers thereof, and/or (ii) an organic compound comprising at least one covalently bonded nitrogen atom and at least one carbonyl moiety.

* * * * *